United States Patent Office 3,162,663
Patented Dec. 22, 1964

3,162,663
SILETHYLENESILARYLENES AND SILOXANE
DERIVATIVES THEREOF
Henry Nelson Beck, Midland, Mich., assignor to Dow
Corning Corporation, Midland, Mich., a corporation of
Michigan
No Drawing. Filed Jan. 10, 1963, Ser. No. 250,470
14 Claims. (Cl. 260—448.2)

This invention relates to a novel organosilicon composition and to siloxane derivatives therefrom.

Specifically, this invention relates to a composition of the formula $$X\underset{R_2}{\underset{|}{Si}}CH_2CH_2\underset{R_2}{\underset{|}{Si}}Y\underset{R_2}{\underset{|}{Si}}CH_2CH_2\underset{R_2}{\underset{|}{Si}}X$$

wherein X is selected from the group consisting of halogen atoms and radicals of the formula —OR′, $$-O\overset{O}{\overset{\|}{C}}R'$$

—O—N=CR′$_2$ and

—O—N=C R″ (cyclic)

R′ is selected from the group consisting of hydrogen and monovalent hydrocarbon radicals, and R″ is a divalent hydrocarbon radical, Y is divalent and selected from the group consisting of p-phenylene, 4,4′-biphenylene, 4,4′-diphenylene ether, p-xylylene, and 4,4′-dimethylenediphenyl ether radicals, and each R is a monovalent hydrocarbon radical free of aliphatic unsaturation.

For the purpose of this invention R′ can be hydrogen or any monovalent hydrocarbon radical. Examples of suitable monovalent hydrocarbon radicals include aliphatic radicals such as methyl, ethyl, propyl, butyl, octadecyl, vinyl, allyl, propargyl, and butadienyl; cycloaliphatic radicals such as cyclobutyl, cyclopentenyl and cyclohexadienyl; aralkyl radicals such as benzyl, phenethyl and 3-phenyloctyl; alkaryl radicals such as tolyl, xylyl and t-butylphenyl; and aryl radicals such as phenyl, xenyl, naphthyl and anthracyl. Hydrogen and the lower alkyl radicals are preferred.

Radical R″ can be any divalent hydrocarbon radical as depicted, such as

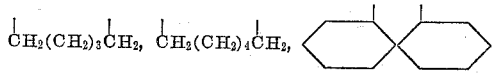

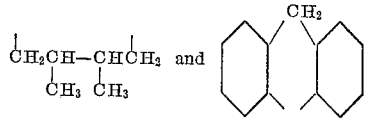

Thus, examples of substituents that can be X include such as chlorine, bromine, hydroxy, methoxy, butoxy, benzoxy, phenoxy, allyloxy, formoxy, acetoxy, butyroxy,

—O—N=C(CH$_3$)$_2$ and

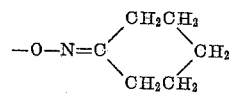

Radical R can be any monovalent hydrocarbon radical free of aliphatic unsaturation. Thus, R can be alkyl such as methyl, ethyl, butyl, octadecyl and myricyl; cycloalkyl such as cyclopentyl and cyclohexyl; aryl such as phenyl, xenyl, naphthyl and anthracyl; and aralkyl and alkaryl such as benzyl, phenethyl, 2-phenylpropyl, tolyl and xylyl. Prefered radicals are those commercially available including, for example, methyl, ethyl, phenyl, xenyl, phenethyl and 2-phenylpropyl.

Thus, illustrative of some of the compositions of this invention are:

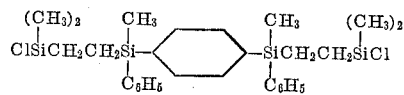

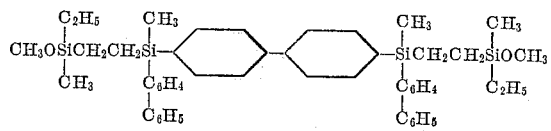

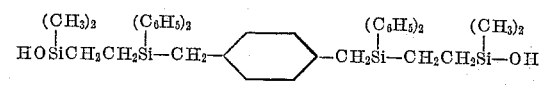

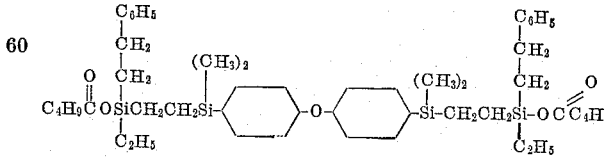

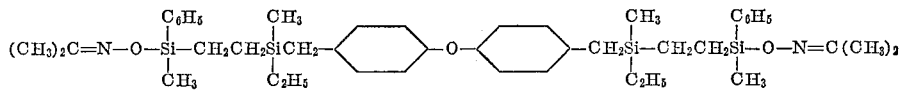

The above compositions are best prepared by reacting one mol of a compound of the formula I 

with at least two mols of a compound of the formula

II 

in the presence of a platinum catalyst, such as platinum black, platinum on a carrier (i.e. alumina or charcoal) or salts of platinum such as chloroplatinic acid. The reaction is normally carried out in the temperature range of from 50 to 150° C. A molecule of II reacts with each silicon-bonded hydrogen atom of I so that the composition III 

is formed. Normally, a slight excess of compound II is employed, in order to drive the desired reaction to completion. After the reaction the excess II can be removed by vacuum stripping, as its volatility is much greater than that of the product. In the formulae above and to follow, the symbols R and Y are as previously defined.

Instead of chlorine on compound II there can be bromine or other halogen, —OR',

—O—N=CR'$_2$, and

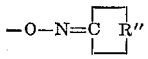

in this particular instance provided only that R' is not hydrogen. Additionally, the reaction can be carried out in the presence of an organic peroxide in place of the platinum catalyst, operating at a temperature sufficient to produce free radicals from the peroxide.

The chlorosilcarbane III above can be converted to any of the other compositions of this invention by well-known reactions. Thus, where X is hydroxyl the product can be obtained by hydrolysis of the halosilcarbane under essentially non-condensing conditions, such as hydrolysis in the cold with large excesses of water, or in the presence of a hydrogen chloride acceptor such as pyridine. Where X is acyloxy, for example, acetoxy, this can be obtained by reaction of the halosilcarbane with acetic anhydride, which reaction is best carried out at the reflux, removing the by-product acetyl chloride as formed. When it is desired to produce the alkoxy derivative, the appropriate alcohol is reacted therewith. This reaction is best carried out under conditions wherein the hydrogen chloride is removed as formed, such as by conducting the reaction at reduced pressure. These and the other related reactions are all well known in silicone chemistry and need not be discussed here in further detail.

A second equally suitable method of preparing the composition of this invention is to react one mol of a compound of the formula IV 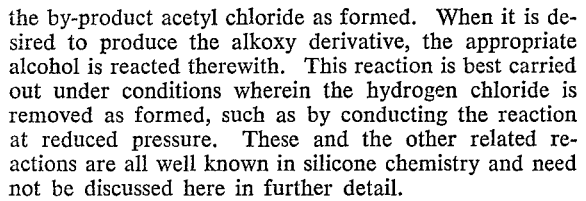

with at least two mols of a compound of the formula

V 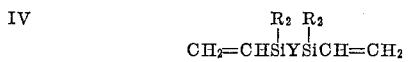

The resulting hydrolyzate can be converted to an even this method as for the first method. The product is the same. This method is preferred when the R radicals of compounds II or V are large, so that the boiling points of these compounds are high. The boiling point of compound V is lower that that of compound II when the R radicals are the same. Thus, it is easier to remove excess V than excess II from a reaction mixture.

This invention also relates to siloxanes of the unit formula

wherein R and Y are as previously defined. These compositions are best prepared by the hydrolysis under condensing conditions of the earlier described silcarbane. The resulitng hydrolyzate can be converted to an even higher polymer by any of the usual techniques employed for conventional siloxanes, such as by the catalytic action of bases (KOH, NaOH, etc.) of acids (H$_2$SO$_4$, C$_6$H$_5$SO$_3$H, etc.). These polymers are useful as film forming agents and as bases for silicone elastomers. The polymer can be crosslinked, or cured, by conventional means for organosilicon polymers, such as by organic peroxides, high energy radiation, or any of several combinations employed for room-temperature curing elastomers.

Various additives can be employed with the above described polymers, such as fillers (silica, alumina, clay, carbon black, etc.), pigments, etc., for any of the usual purposes for which these various additives are used in conventional siloxanes.

This invention also relates to copolymers comprising (A) at least one unit of the structure

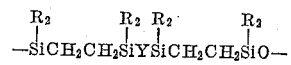

and (B) units of the structure

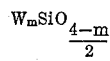

wherein R and Y are as previously defined, W is a monovalent hydrocarbon or halohydrocarbon radical and $m$ is an integer of from 0 to 3 inclusive. Preferred copolymers are those wherein in (B) the integer $m$ is substantially 2. The compositions can be made by, for example, cohydrolysis of a chlorosilcarbane of this invention with a chlorosilane of the formula $W_nSiCl_{4-n}$. Another method of preparing the above copolymers consists of mixing siloxanes of the unit Formulae A and B above and in the presence of a siloxane bond-rearranging catalyst, to cause equilibration of the two siloxane types to form the desired copolymer.

A third method of preparing the above defined copolymers consists of mixing a hydroxyl compound of the structure

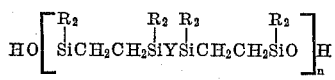

wherein R and Y are as above identified and $n$ is at least one, a hydroxylated siloxane of the unit formula

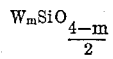

W and $m$ being as previously defined, which siloxane has a plurality of hydroxyl radicals attached thereto, and a catalyst which condenses silanols to siloxanes, such as an organic isocyanate (U.S. 3,032,530) or a beta-amino acid or lactam (U.S. 2,902,468). This method is preferred when it is desired to prepare block copolymers.

The copolymers described above are useful as rubbers and plastics for such as gasketing and coating applications. The copolymers can be cured by means normally employed for conventional polysiloxanes, as stated earlier. Various additives (fillers, pigments, plasticizers, compression set additives, etc.) can be employed, if desired.

The following examples are illustrative only and are not to be construed as limiting the invention which is properly delineated in the appended claims. In the examples the symbol Me is used to represent the methyl radical.

*Example 1*

A mixture of 335.9 g. (2.784 mols) of chlorodimethylvinylsilane and 1.02 g. of a t-butanol solution of chloroplatinic acid (0.2 percent by weight of platinum) was heated to the reflux, and with stirring, there was added slowly 263.7 g. (1.356 mols) of p-bis(dimethylsilyl)benzene. Reflux was continued an additional two hours, during which time the temperature of the reacting mixture rose to 145° C. Upon cooling to room temperature the reaction mixture solidified. Recrystallization from n-hexane gave 325.2 g. (55.0% yield) of a white solid, melting point 61 to 83° C. Analysis for silicon and chlorine, and infra-red analysis confirmed the structure as

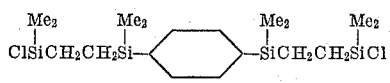

*Example 2*

A mixture of 28.39 g. (0.2353 mol) of chlorodimethylvinylsilane and 11 drops of the platinum solution of Example 1 were heated to reflux, and with vigorous agitation, there was added slowly 33.00 g. (0.1152 mols) of bis(p-dimethylsilylphenyl)ether, of the formula

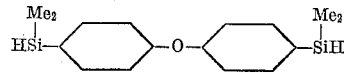

over a period of 22 minutes. Reflux was continued for an additional 2½ hours, by which time the temperature of the reaction mixture had reached 150° C. The product was fractionally distilled to give 19.67 g. of the chlorosilane of the formula

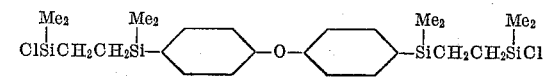

boiling at 214 to 220° C./0.25 mm., $n_D^{25}$ 1.5303. The structure was confirmed by infra-red analysis, silicon and chlorine analysis, and molar refraction.

*Example 3*

A solution of 128.6 g. (0.2951 mol) of the product of Example 1 in 550 ml. of acetone was added at room temperature over a period of 20 minutes to a stirred solution of 82.1 g. (0.775 mol) of sodium carbonate in 300 ml. of water. The resulting stirred mixture was then refluxed for 2½ hours. Thereafter, the acetone was removed by distillation, hot water (100 ml.) was added, and benzene (300 ml.) used to dissolve the hydrolyzed silane. The water was separated and the benzene solution washed with small portions of water until free of inorganic salts. After drying the solution, the benzene was removed by evacuation at room temperature. Last traces of benzene were removed by evacuation to 205° C. at 0.3 mm. The product, a siloxane of the unit formula

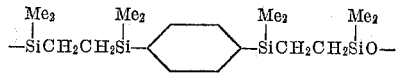

was a milk-white viscous fluid having a refractive index $n_D^{25}$ of 1.5089.

*Example 4*

A 25.9 g. portion of the siloxane of Example 3 was dissolved in 200 ml. of benzene, and five drops of tetramethyl-guanidine-2-ethylhexoate were added thereto. The mixture was heated to reflux with azeotrope for a period of five days. During this time a total of 0.42 ml. (0.023 mol) of water was removed. The solvent was then removed by heating to 100° C. at 0.5 mm. in a revolving stripping apparatus. The product was a tannish yellow translucent high polymer which showed very slight flow.

*Example 5*

When the following silanes (A) are reacted with the following vinylsilanes (B) in the presence of powered platinum, products (C) as shown are formed:

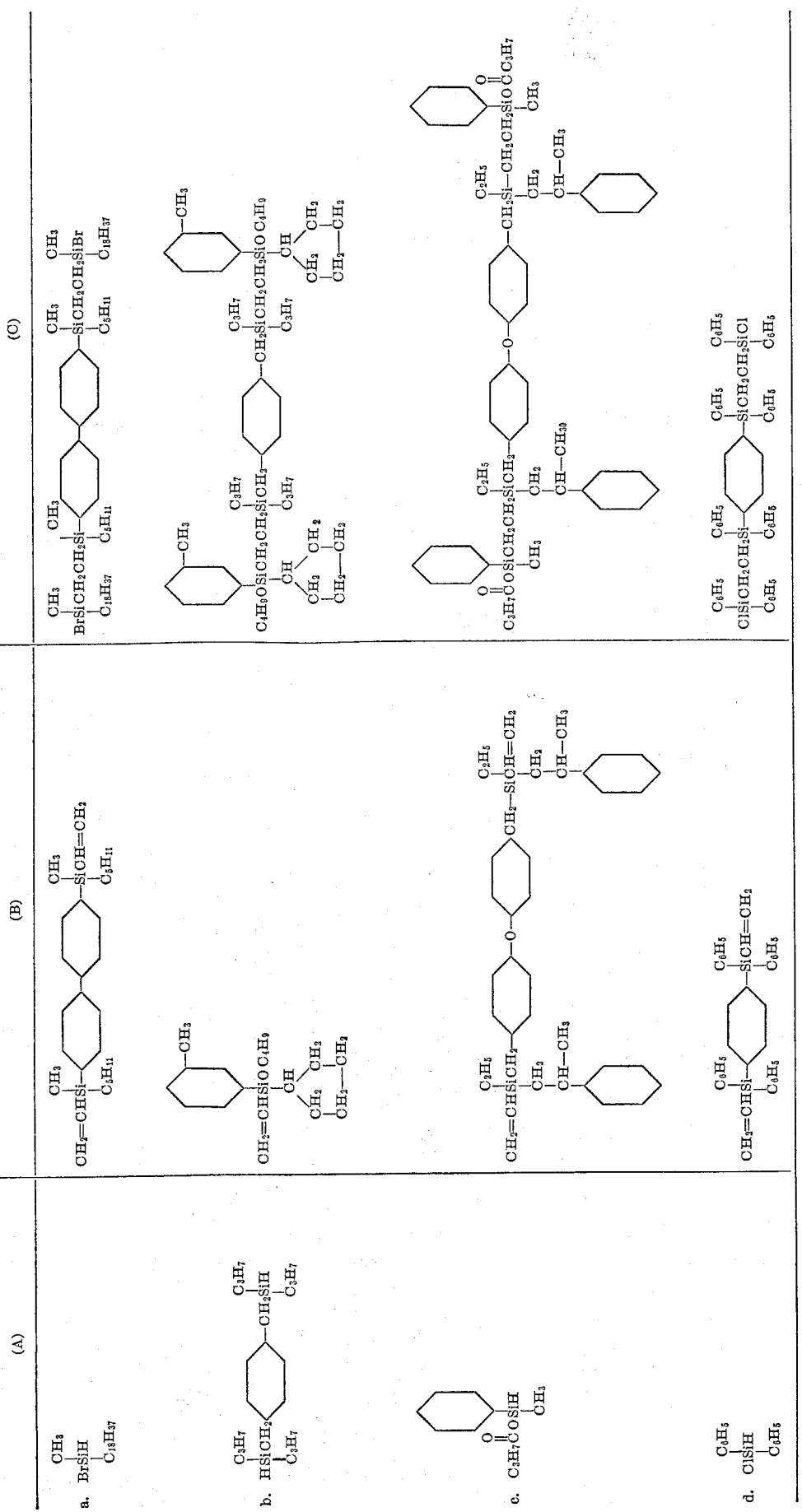

Example 6

Similar results are obtained when any of the following catalysts are employed in place of the powdered platinum of Example 5; platinum on charcoal, platinum on alumina, chloroplatinic acid, platinum sulfate, benzoyl peroxide, di-t-butyl peroxide.

Example 7

When the following reagents (D) are reacted with the product of Example 1, compounds (E) as shown are formed:

| (D) | (E) |
|---|---|
| a. CH₃OH | CH₃OSi(Me₂)CH₂CH₂Si(Me₂)—⟨⬡⟩—Si(Me₂)CH₂CH₂Si(Me₂)OCH₃ |
| b. H₂O | HOSi(Me₂)CH₂CH₂Si(Me₂)—⟨⬡⟩—Si(Me₂)CH₂CH₂Si(Me₂)OH |
| c. HC(=O)—ONa | HC(=O)—OSi(Me₂)CH₂CH₂Si(Me₂)—⟨⬡⟩—Si(Me₂)CH₂CH₂Si(Me₂)—OCH(=O) |
| d. (CH₃CO)₂O | CH₃C(=O)—OSi(Me₂)CH₂CH₂Si(Me₂)—⟨⬡⟩—Si(Me₂)CH₂CH₂Si(Me₂)—OC(=O)CH₃ |
| e. (CH₃)₂C=N—OH | (CH₃)₂C=NOSi(Me₂)CH₂CH₂Si(Me₂)—⟨⬡⟩—Si(Me₂)CH₂CH₂Si(Me₂)—ON=C(CH₃)₂ |
| f. H₂C(CH₂CH₂CH₂CH₂)C=NOH (cyclopentanone oxime) | H₂C(CH₂CH₂CH₂CH₂)C=NOSi(Me₂)CH₂CH₂Si(Me₂)—⟨⬡⟩—Si(Me₂)CH₂CH₂SiO—N=C(CH₂CH₂CH₂CH₂) |

Example 8

When the product of Example 5d is carefully hydrolyzed with water there is formed in good yield the compound of the formula HOSi(C₆H₅)₂CH₂CH₂Si(C₆H₅)₂—⟨⬡⟩—Si(C₆H₅)₂CH₂CH₂Si(C₆H₅)₂OH

Example 9

Condensation of the product of Example 8 in benzene employing tetramethylguanidine di-2-ethylhexoate in catalytic amounts will produce a high polymer of the unit formula —Si(C₆H₅)₂CH₂CH₂Si(C₆H₅)₂—⟨⬡⟩—Si(C₆H₅)₂CH₂CH₂Si(C₆H₅)₂O—

Example 10

When 10 g. of the polymer of Example 4 and 20 g. of a hydroxylated dimethylpolysiloxane fluid having a viscosity of 100 cs. at 25° C. are mixed and heated together in the presence of a small amount of powdered potassium hydroxide, a copolymer is formed containing at least one unit of the structure —Si(Me₂)CH₂CH₂Si(Me₂)—⟨⬡⟩—Si(Me₂)CH₂CH₂Si(Me₂)O— and units of the structure Me₂SiO.

Example 11

When 20 g. of silanol (E) of Example 7(b), 20 g. of [C₆H₅(CH₃)SiO]₄ cyclic and 0.1 g. of the cyclic tetramer of methylvinylsiloxane are mixed with 0.05 g. of the potassium salt of (C₆H₅)₂CH₃SiOH and heated at 150° C. for several hours, a copolymer is formed containing units of the structure —Si(Me₂)CH₂CH₂Si(Me₂)—⟨⬡⟩—Si(Me₂)CH₂CH₂Si(Me₂)O— along with phenylmethylsiloxane units, methylvinylsiloxane units and diphenylmethylsiloxane units.

Example 12

A copolymer is formed containing blocks of the unit formula

—Si(C₆H₅)₂CH₂CH₂Si(C₆H₅)₂—⟨⬡⟩—Si(C₆H₅)₂CH₂CH₂Si(C₆H₅)₂O— and blocks of phenylsiloxane units when a mixture of the silanol of Example 8 and a hydroxylated benzene-soluble monophenylpolysiloxane is dissolved in toluene and heated to reflux with azeotrope in the presence of n-hexylamine octoate in catalytic amounts.

That which is claimed is:

1. A composition of the formula

XSi(R₂)CH₂CH₂Si(R₂)YSi(R₂)CH₂CH₂Si(R₂)X wherein
X is selected from the group consisting of halogen atoms and radicals of the formula —OR', —ON=CR'₂ and

—OC(=O)R'

—O—N=C⌐R''⌐

R' is selected from the group consisting of hydrogen and monovalent hydrocarbon radicals,
R'' is a divalent hydrocarbon radical,
Y is divalent and selected from the group consisting of p-phenylene, 4,4'-biphenylene, 4,4'-diphenylene ether, p-xylylene, and 4,4'-dimethylenediphenyl ether radicals, and each
R is a monovalent hydrocarbon radical free of aliphatic unsaturation.

2. The composition according to claim 1 wherein X is halogen and Y is p-phenylene.

3. The composition according to claim 1 wherein X is —OR′, R′ is a monovalent hydrocarbon radical and Y is p-phenylene.

4. The composition according to claim 1 wherein X is —OR′, R′ is hydrogen and Y is p-phenylene.

5.

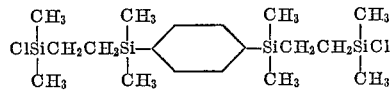

6. The composition according to claim 2 wherein some of the R radicals are phenyl and the remainder are methyl.

7.

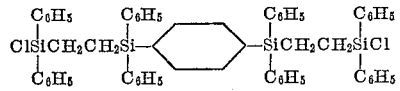

8.

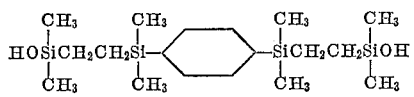

9. The composition according to claim 4 wherein some of the R radicals are methyl and the remainder are phenyl.

10. A siloxane of the unit formula

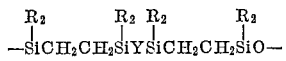

wherein Y is divalent and selected from the group consisting of p-phenylene, 4,4′-biphenylene, 4,4′-diphenylene ether, p-xylylene, and 4,4′-dimethylenediphenyl ether radicals, and R is a monovalent hydrocarbon radical free of aliphatic unsaturation.

11. The siloxane of claim 10 wherein Y is p-phenylene.

12. A copolymer comprising
(A) at least one unit of the structure

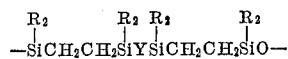

wherein
Y is selected from the group consisting of p-phenylene, 4,4′-biphenylene, 4,4′-diphenylene ether, p-xylylene, and 4,4′-dimethylenediphenyl ether radicals, and
R is a monovalent hydrocarbon radical free of aliphatic unsaturation, and
(B) units of the structure

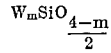

wherein
W is selected from the group consisting of monovalent hydrocarbon and halohydrocarbon radicals, and
$m$ is an integer of from 0 to 3 inclusive 13. The composition of claim 12 where Y is p-phenylene, W is hydrocarbon and $m$ is two.

14.

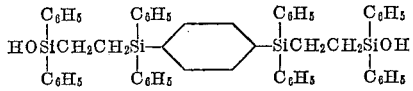

References Cited in the file of this patent
UNITED STATES PATENTS

| | | |
|---|---|---|
| 2,884,433 | Smith | Apr. 28, 1959 |
| 3,020,299 | Marsden | Feb. 6, 1962 |
| 3,041,362 | Merker | June 26, 1962 |

UNITED STATES PATENT OFFICE
CERTIFICATE OF CORRECTION

Patent No. 3,162,663            December 22, 1964

Henry Nelson Beck

It is hereby certified that error appears in the above numbered patent requiring correction and that the said Letters Patent should read as corrected below.

Column 2, lines 59 to 63, the formula should appear as shown below instead of as in the patent:

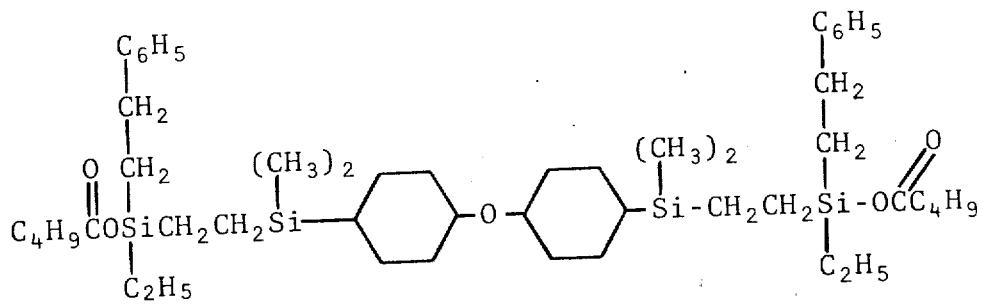

column 4, line 36, strike out "The resulting hydrolyzate can be converted to an even" and insert instead -- The same catalysts, conditions, and alternatives apply in --; columns 7 and 8, in the table, under the heading "(B)", the third formula should appear as shown below instead of as in the patent:

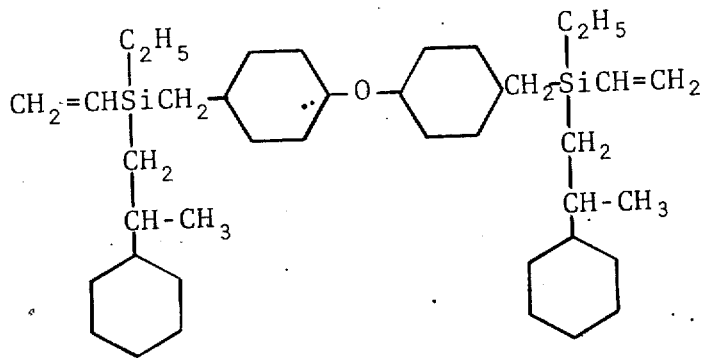

same table, under the heading "(C)", the third formula should appear as shown below instead of as in the patent:

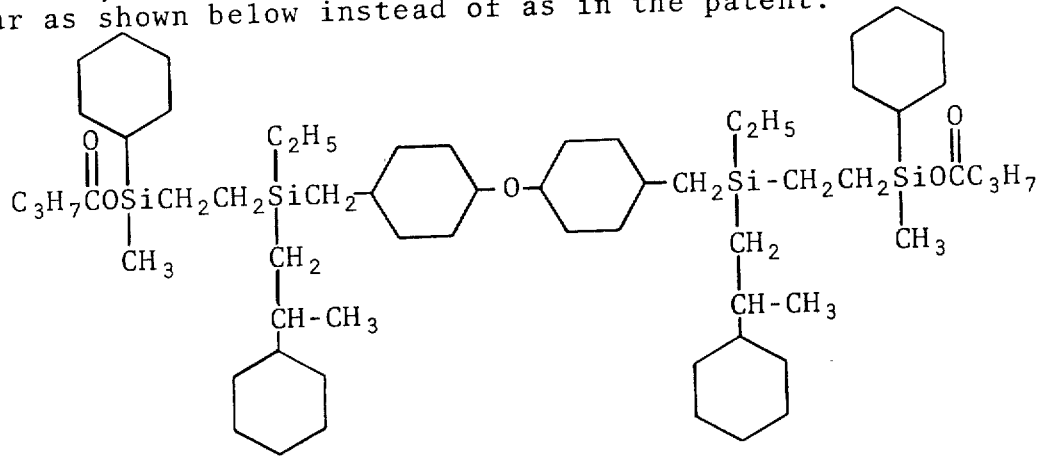

Signed and sealed this 13th day of July 1965.

(SEAL)
Attest:

ERNEST W. SWIDER
Attesting Officer

EDWARD J. BRENNER
Commissioner of Patents